(12) United States Patent
Hecht (10) Patent No.: US 9,120,239 B2
(45) Date of Patent: Sep. 1, 2015

(54) CUTTING TOOL AND CUTTING INSERT HAVING INSERT KEY RECESSES FOR EXTRACTING AND MOUNTING THEREIN

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 313 days.

(21) Appl. No.: 13/773,376

(22) Filed: Feb. 21, 2013

(65) Prior Publication Data

US 2014/0234040 A1  Aug. 21, 2014

(51) Int. Cl.
*B23B 27/04* (2006.01)
*B26D 7/00* (2006.01)
*B26D 7/26* (2006.01)
*B23B 29/04* (2006.01)

(52) U.S. Cl.
CPC . *B26D 7/00* (2013.01); *B23B 27/04* (2013.01); *B23B 29/043* (2013.01); *B26D 7/26* (2013.01); *B23B 2205/02* (2013.01); *B23B 2260/0785* (2013.01); *Y10T 29/49826* (2015.01); *Y10T 407/2282* (2015.01); *Y10T 407/2286* (2015.01); *Y10T 407/2288* (2015.01); *Y10T 407/23* (2015.01); *Y10T 407/25* (2015.01)

(58) Field of Classification Search
CPC .... B23B 27/04; B23B 27/16; B23B 27/1625; B23B 27/164; B23B 27/1666; B23B 29/043; B23B 29/06; B23B 29/14; B23B 2205/02; B23B 2205/12; B23B 2205/125; B23B 2220/12
USPC ............. 407/72, 91, 102, 107, 109, 110, 111, 407/113, 117; 81/177.85
See application file for complete search history.

(56) References Cited

U.S. PATENT DOCUMENTS

| 4,938,640 A | 7/1990 | Pano et al. |
| 5,836,723 A | 11/1998 | Von Haas et al. |
| 5,934,843 A | 8/1999 | Brask et al. |

(Continued)

FOREIGN PATENT DOCUMENTS

| DE | 202006008229 U1 | 8/2006 |
| JP | 2007-253299 | 10/2007 |

(Continued)

OTHER PUBLICATIONS

International Search Report dated May 16, 2014 issued in PCT counterpart application (No. PCT/IL2014/050136).

*Primary Examiner* — Daniel Howell
*Assistant Examiner* — Nicole N Ramos
(74) *Attorney, Agent, or Firm* — Womble Carlyle (57) ABSTRACT

A cutting insert has upper and lower faces, and a peripheral surface with two longitudinal insert side surfaces. Two similar through-going transverse insert key recesses open out to the insert side surfaces and to the insert lower surface. Each insert key recess has a similar profile when viewed in transverse cross sections of the cutting insert. Each insert key recess is limited by an insert recess top surface and insert recess side surfaces. The insert recess side surfaces are symmetrical about a plane. A holder blade for holding the cutting insert has upper and lower jaws for clamping the cutting insert therein, and a holder recess. The lower jaw has a leading surface and lower jaw recess. A cutting-tool key has two key members, fitted into the holder recess and an insert key recess, to force the cutting insert to mount it to or extract it from the cutting tool.

20 Claims, 4 Drawing Sheets

(56) References Cited

U.S. PATENT DOCUMENTS

| | | | |
|---|---|---|---|
| 5,980,165 A * | 11/1999 | Hansson et al. | 407/107 |
| 7,665,933 B2 | 2/2010 | Nagaya et al. | |
| 7,758,286 B2 * | 7/2010 | Nagaya et al. | 407/101 |
| 7,896,585 B2 | 3/2011 | Hecht | |
| 8,366,355 B2 * | 2/2013 | Nagaya et al. | 407/113 |
| 2002/0054792 A1 * | 5/2002 | Hansson et al. | 407/72 |
| 2002/0081165 A1 | 6/2002 | Hecht | |
| 2006/0062640 A1 | 3/2006 | Kugler et al. | |
| 2007/0207671 A1 * | 9/2007 | Nagaya et al. | 439/607 |
| 2010/0061814 A1 * | 3/2010 | Hecht | 407/92 |
| 2010/0119314 A1 * | 5/2010 | Nagaya et al. | 407/113 |
| 2011/0255926 A1 * | 10/2011 | Hecht | 407/66 |
| 2013/0167345 A1 * | 7/2013 | Hecht | 29/267 |
| 2013/0170918 A1 * | 7/2013 | Hecht | 407/110 |

FOREIGN PATENT DOCUMENTS

| | | |
|---|---|---|
| WO | 2004/048020 A1 | 6/2004 |
| WO | WO 2008133199 A1 * | 11/2008 |

* cited by examiner

CUTTING TOOL AND CUTTING INSERT HAVING INSERT KEY RECESSES FOR EXTRACTING AND MOUNTING THEREIN

FIELD OF THE INVENTION

The present invention relates to a cutting insert for self-clamping into a cutting tool holder blade, in general, and to a self-clamping cutting insert and cutting tool for parting and grooving operations, in particular.

BACKGROUND OF THE INVENTION

Metal cutting tools for parting and grooving have a holder blade for firmly clamping a cutting insert within a tool holder blade. The cutting insert is self-clamped into an insert pocket or slot formed in the holder blade. In some cases the cutting insert is mounted and extracted to the tool holder by employing a key. Elongated cutting inserts are clamped into insert pockets of appropriate size and length, and may be employed in metal cutting, such as in parting and grooving operations. Other cutting inserts have holes or recesses for positioning in a desired location in the cutting tool, or to allow gripping of the cutting insert in the cutting tool. Examples of such cutting tools and cutting inserts are disclosed in U.S. Pat. Nos. 4,938, 640, 5,836,723, 5,934,843, 7,665,933, 7,896,585, EP1666179, WO04/048020, and JP2007-253299.

It is an object of the present invention to provide an improved cutting insert for parting and grooving and a cutting tool for holding such a cutting insert. The cutting insert has two through-going transverse insert key recesses in a lower surface thereof, for allowing engagement of a cutting tool key for extracting and mounting of the cutting insert from and into the cutting tool. It is further an object of the present invention to provide a method for extracting and mounting of such a cutting insert from and into the cutting tool.

SUMMARY OF THE INVENTION

In accordance with the present invention, there is provided a cutting insert having an insert longitudinal mid-axis and an insert transverse middle plane, the cutting insert comprising:
an insert upper surface, and an insert lower surface, the insert lower surface defining a first plane perpendicular to the insert transverse middle plane and the insert upper surface defining a second plane parallel to the first plane, the second plane being vertically spaced apart from the first plane by an insert height;
a peripheral surface extending between the insert upper and lower surfaces, and having two opposing longitudinal surfaces;
two cutting edges; and
two through-going transverse insert key recesses, each extending along an insert recess axis and opening out to the longitudinal surfaces and to the insert lower surface, the insert key recesses located symmetrically about the insert transverse middle plane, each insert key recess having an insert recess top surface and two insert recess side surfaces,
wherein each insert key recess has a similar recess profile in cross sections taken along the insert recess axis, and
wherein in each insert key recess, the insert recess side surfaces are symmetrical relative to an imaginary plane which is parallel to the insert transverse middle plane and contains the insert recess axis.

In accordance with another aspect of the present invention, there is provided a cutting tool comprising a holder blade and a cutting insert, wherein:

the holder blade comprises:
two opposing side surfaces and a holder front surface;
an insert receiving slot having a longitudinal slot axis and opening out to the holder front surface and to the side surfaces, the insert receiving slot comprising:
an upper jaw having at least one longitudinal upper jaw clamping surface; and
a lower jaw having a lower jaw top surface including a plurality of longitudinal lower jaw clamping portions, an insert leading surface, and a lower jaw recess opening out to the insert leading surface and to at least one of the side surfaces; and
a holder recess opening out to at least one of the side surfaces, the holder recess being located below the lower jaw top surface in a side view of the holder blade; and
the cutting insert having an insert longitudinal mid-axis and comprising:
an insert upper surface, an insert lower surface and a peripheral surface extending therebetween, the peripheral surface having two opposing longitudinal surfaces, the insert lower surface having a plurality of insert lower clamping portions; and
two through-going transverse insert key recesses each extending along a transverse insert recess axis and opening out to the longitudinal surfaces and to the insert lower surface, each insert key recess has a similar recess profile in cross sections taken along the insert recess axis;
in an assembled position, the cutting insert is located in a rearmost position in the insert receiving slot, the insert lower clamping portions are clamped against the lower jaw clamping portions, and the insert upper surface is clamped against the at least one upper jaw clamping surface.

In accordance with yet another aspect of the present invention, there is provided a method of mounting and extracting a cutting insert into and from a cutting tool by means of a cutting tool key; wherein
the cutting tool is as described above;
the cutting tool key has a first and second key members, located along a key axis, the first key member is formed to fit into the one of the insert key recesses, and the second key member is formed to fit into the holder recess;
the method comprising the steps of:
positioning the cutting tool key relative to the cutting tool such that the first and second key members simultaneously engage the insert key recess and the holder recess, respectively;
to extract the cutting insert from the assembled position, rotating the cutting tool key in an extracting direction to apply an extraction force to move the cutting insert in the forward direction, and
to mount the cutting insert from the partially assembled position, rotating the cutting tool key in a mounting direction, opposite to the extracting direction, to apply a mounting force to move the cutting insert in the rearward direction.

In accordance with a further aspect of the present invention, there is provided a cutting tool comprising a holder blade and a cutting insert in accordance with the above, wherein:
the holder blade comprises:
an upper jaw having at least one longitudinal upper jaw clamping surface; and
a lower jaw having a lower jaw top surface provided with a lower jaw recess; and
an insert receiving slot defined between the upper jaw and lower jaw, the insert receiving slot having a longitudinal slot axis; and a holder recess located below the lower jaw top surface in a side view of the holder blade; and the cutting tool is adjustable between:

an assembled position in which the insert key recesses are both spaced apart from the lower jaw recess and the insert longitudinal mid axis is parallel to the slot axis; and a partially assembled position in which one of the insert key recesses is opposite the lower jaw recess, and the insert longitudinal mid axis forms a tilt angle with the slot axis.

BRIEF DESCRIPTION OF THE DRAWINGS

For a better understanding, the invention will now be described, by way of example only, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

The present invention relates to an elongated cutting insert for parting and grooving, for self-clamping into an insert receiving slot of a tool holder blade, the insert having two through-going transverse insert key recesses opening out to a lower surface thereof. The holder blade has a holder recess therein, spaced apart from the insert receiving slot. A cutting tool key has two members for simultaneously engaging one of the insert key recesses, and also the holder recess. The cutting tool key is moved in a mounting direction in order to force the cutting insert into the insert receiving slot. The key is moved in an opposite extracting direction in order to extract the cutting insert from the insert receiving slot.

Figure 1:
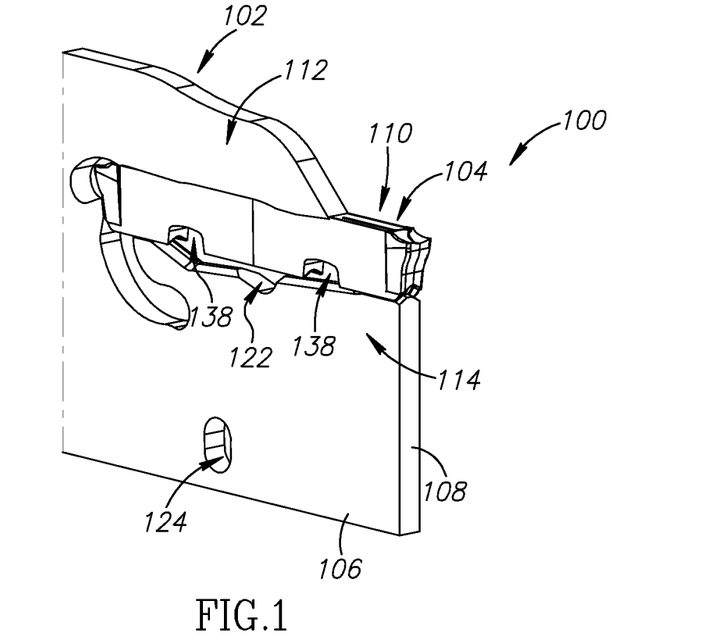
FIG. 1 is a perspective view of a cutting tool in accordance with an embodiment of the present invention, in the assembled position.
Figure 2:
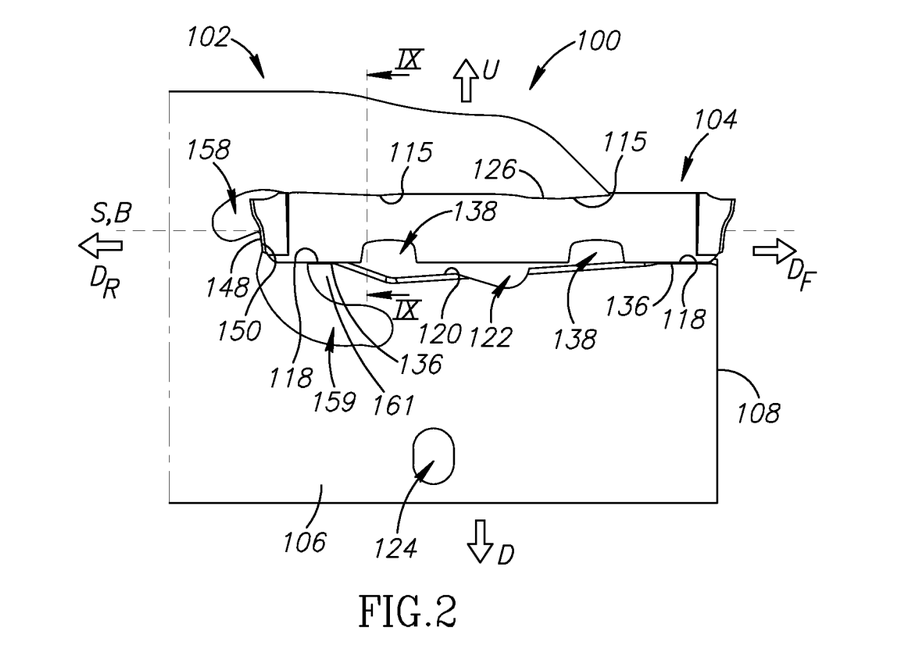
FIG. 2 is a side view of the cutting tool shown in FIG. 1.

Reference is now made to FIGS. 1 and 2, depicting a cutting tool 100, in a perspective view and a side view, respectively, in accordance with an embodiment of the disclosed technique. The cutting tool 100 includes a holder blade 102 and a cutting insert 104. In an assembled position, the cutting insert 104 is resiliently clamped in the holder blade 102. The holder blade 102 includes two opposing side surfaces 106 and a holder front surface 108. An insert receiving slot 110 has a longitudinal slot axis S, and opens out to the holder front surface 108 and to the side surfaces 106. The slot axis S extends from the forward to rearward direction $D_F$, $D_R$.

It should be noted, that the term "longitudinal" as used herein refers to the forward-rearward direction $D_F$, $D_R$, the term "vertical" as used herein refers to an upward-downward direction U, D, and the term "transverse" as used herein refers to a direction perpendicular both to the longitudinal and to the vertical directions.

Figure 4:
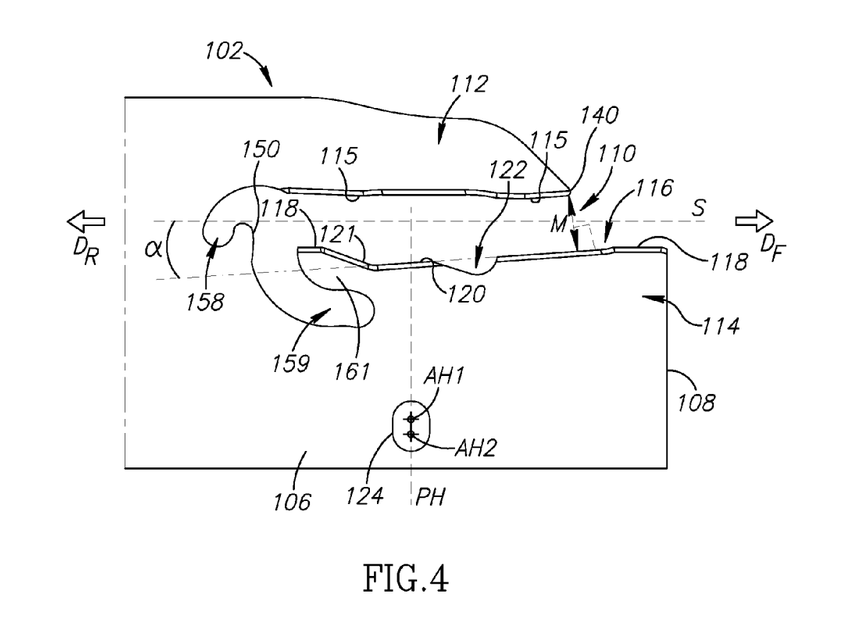
FIG. 4 is a side view of the holder blade of the cutting tool shown in FIG. 1.

Reference is further made to FIG. 4, depicting that the insert receiving slot 110 includes an upper jaw 112 provided with at least one longitudinal upper jaw clamping surface 115, a lower jaw 114 provided with a lower jaw top surface 116, and a holder rear stopper 150, located rearwards of the upper and lower jaws 112, 114. The lower jaw top surface 116 includes a plurality of longitudinal lower jaw clamping portions 118, a transition surface 121, an insert leading surface 120 and a lower jaw recess 122. The insert leading surface 120 may be tilted by a tilt angle α relative to the slot axis S in a side view of the cutting tool 100. The lower jaw recess 122 opens out to the insert leading surface 120 and to at least one of the side surfaces 106. The transition surface 121 extends between one of the lower jaw clamping portions 118 and the insert leading surface 120.

The holder blade 102 further includes a holder recess 124 opening out to at least one of the side surfaces 106. The holder recess 124 is located below the lower jaw top surface 116 in a side view of the holder blade 102. In a particular embodiment of the present invention, the holder recess 124 is located below the transition surface 121. The holder recess 124 has two transverse holder recess axes AH1, AH2 passing therethrough, spaced apart from one another, and located in a transverse holder plane PH extending perpendicular to the slot axis S. The first transverse holder recess axis AH1 is closer to the insert receiving slot 110 than the second transverse holder recess axis AH2.

Figure 3:
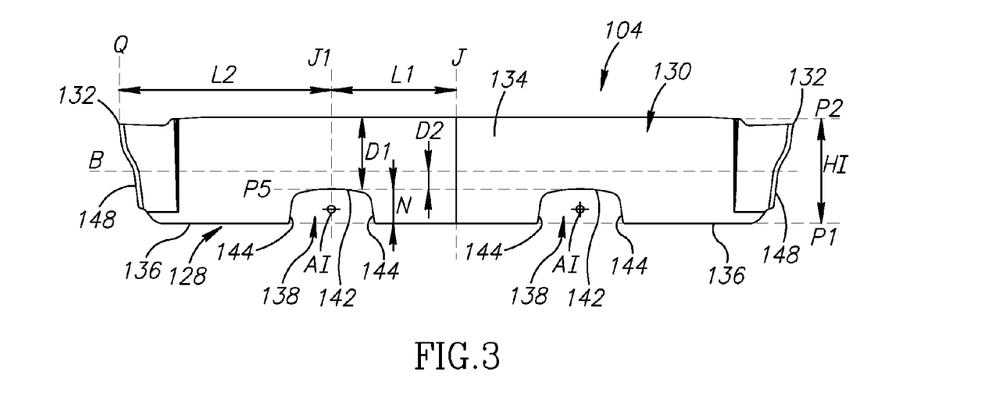
FIG. 3 is a side view of the cutting insert of the cutting tool shown in FIG. 1.

Reference is made to FIG. 3, in which the cutting insert 104 is shown in detail. The cutting insert 104 is an elongated cutting insert having an insert longitudinal mid-axis B and an insert transverse middle plane J. The cutting insert 104 includes an insert upper surface 126, and an insert lower surface 128. The insert lower surface 128 defines a first plane P1 perpendicular to the insert transverse middle plane J, and the insert upper surface 126 defines a second plane P2 parallel to the first plane P1. The first and second planes P1, P2, are vertically spaced apart by an insert height HI. A peripheral surface 130 extends between the insert upper and lower surfaces 126, 128, and has two opposing longitudinal surfaces 134. Two cutting edges 132 are associated with opposite ends of the insert upper surface 126. The peripheral surface 130 also includes two insert stopper abutment surfaces 148, each located between a respective one of the cutting edges 132 and the insert lower surface 128.

The cutting insert 104 further includes two through-going transverse insert key recesses 138, each extending along a transverse insert recess axis AI. Each insert key recess 138 opens out to the longitudinal surfaces 134 and to the insert lower surface 126. The insert key recesses 138 are located symmetrically about the insert transverse middle plane J along the insert longitudinal mid-axis B. Each insert key recess 138 is limited between an insert recess top surface 142 and two insert recess side surfaces 144. Since the insert key recesses 138 are identical, only one of them is shown in detail in the drawings and is discussed in detail herein.

Figure 5:
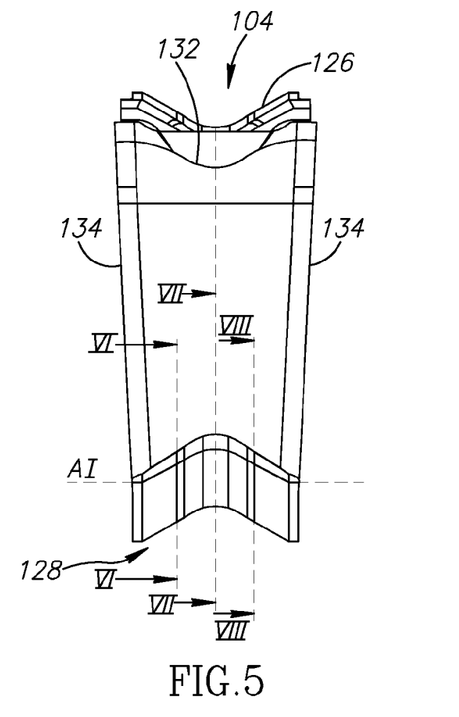
FIG. 5 is a front view of the cutting insert of the cutting tool shown in FIG. 1.
Figure 6:
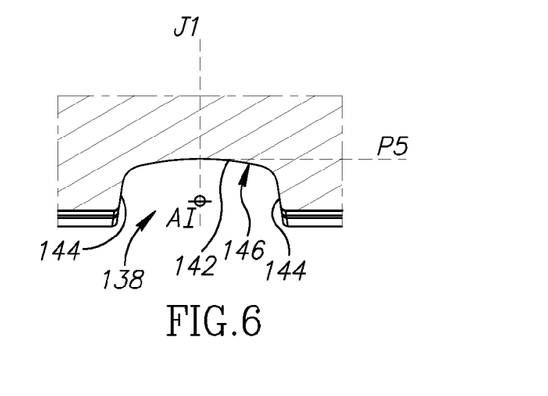
FIG. 6 is a cross section of an insert key recess of the cutting insert shown in FIG. 5, as per the cutting line VI-VI.
Figure 7:
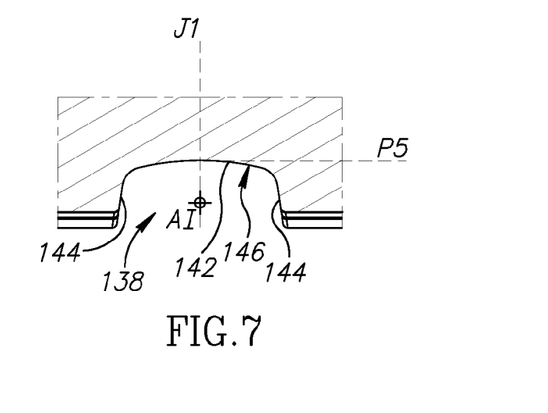
FIG. 7 is another cross section of an insert key recess of the cutting insert shown in FIG. 5, as per the cutting line VII-VII.
Figure 8:
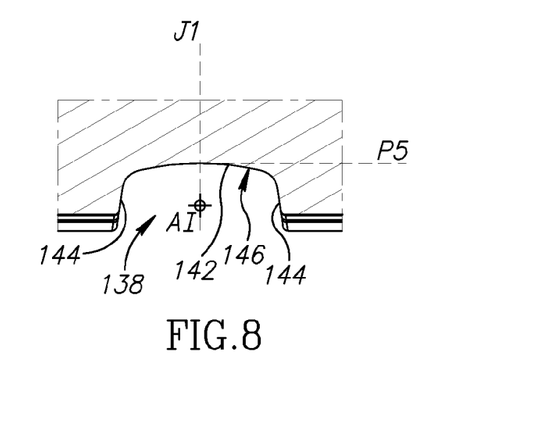
FIG. 8 is a further cross section of an insert key recess of the cutting insert shown in FIG. 5, as per the cutting line VIII-VIII.

With reference to FIG. 5, the cutting insert 104 is shown in a front view along the insert mid-axis B. FIG. 6-8 depict various transverse cross sectional views of the insert key recess 138, taken along the transverse insert recess axis AI, as per respective cutting lines indicated in FIG. 5. Each insert key recess 138 has a similar recess profile 146 in the cross sections taken along the transverse insert recess axis AI. In other words, each insert key recess 138 is a uniform through recess opening out to the insert lower surface 128 and to the insert side surfaces 134. Further, the insert recess side surfaces 144 of each insert key recess 138 are symmetrical relative to an imaginary plane J1 which is parallel to the insert transverse middle plane J and contains the transverse insert recess axis AI.

The insert recess top surfaces 142 are located on an insert recess top plane P5 parallel to the first plane P1. The insert recess top plane P5 is vertically spaced apart from the first plane P1 by an insert recess height N, and from the second plane P2 by a first distance D1. The insert recess height N is smaller than the first distance D1 (i.e., N<D1). Further, the insert recess top plane P5 is vertically spaced apart from the insert mid-axis B by a second distance D2, and the insert recess height N is greater than the second distance D2 (i.e., N>D2). Since the insert mid-axis B is midway between the first plane P1 and the second plane P2 in the vertical direction of the side view of FIG. 3, the above relationships mean that the insert recess height N is between ¼ and ½ of the insert height H1 between the first and second planes P1, P2.

As indicated in FIG. 3, the transverse insert recess axis AI is spaced apart from the insert transverse middle plane J by a first longitudinal distance L1, as is imaginary plane J1. A transverse cutting edge plane Q passes through the cutting edge 132, adjacent to that transverse insert recess axis AI. The transverse insert recess axis AI, is spaced apart from the cutting edge plane Q by a second longitudinal distance L2, as is imaginary plane J1. According to a preferred embodiment of the present invention, the first longitudinal distance L1 is smaller than the second longitudinal distance L2 (i.e., L1<L2). In other words, each of the insert key recesses 138 is located closer to the insert transverse middle plane J than to the adjacent cutting edge plane Q. The operational forces acting on the cutting insert 104 during metal cutting operations, are applied on the cutting edge 132, which contacts the operated work piece. Thus, when the insert key recess 138 is formed farther from the adjacent cutting edge 132, forces and stress around the insert key recesses 138 may be reduced, thereby reducing the chance of possible breakage of the cutting insert 104 in the vicinity of the insert key recesses 138.

In the assembled position of the cutting tool 100 (FIGS. 1 and 2), the cutting insert 104 is located in a rearmost position in the insert receiving slot 110, such that the insert stopper abutment surface 148 abuts the holder rear stopper 150, and the insert longitudinal mid-axis B is parallel to the slot longitudinal axis S. According to a certain embodiment of the present invention, and as shown in FIG. 2, the insert longitudinal mid-axis B coincides with the slot longitudinal axis S. Further, the insert lower clamping portions 136 are clamped against the lower jaw clamping portions 118, and the insert upper surface 126 is clamped against the at least one upper jaw clamping surface 115.

Figure 9:
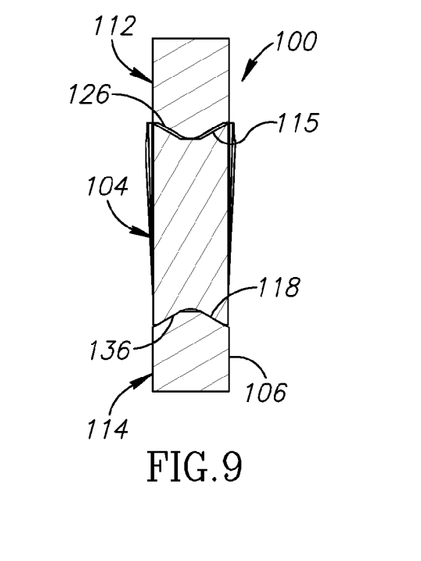
FIG. 9 is a partial cross section of the cutting tool shown in FIG. 2, as per the cutting line IX-IX.

Reference is further made to FIG. 9, depicting a partial cross sectional view of the cutting tool 100 as per the cutting line IX-IX, as marked in FIG. 2. According to an embodiment of the present invention, the insert upper surface 126 and the insert lower clamping portions 136 have a V-shape cross section when viewed along the insert mid-axis B. Further, the at least one upper jaw clamping surface 115 and the lower jaw clamping portions 118 have a V-shape cross section when viewed along the slot longitudinal axis S. Such complementary V-shape of the clamping portions provides for a better clamping structure for the cutting insert 104 in the insert receiving slot 110, and prevents sideways movement of the cutting insert 104 under various operational forces.

Figure 10:
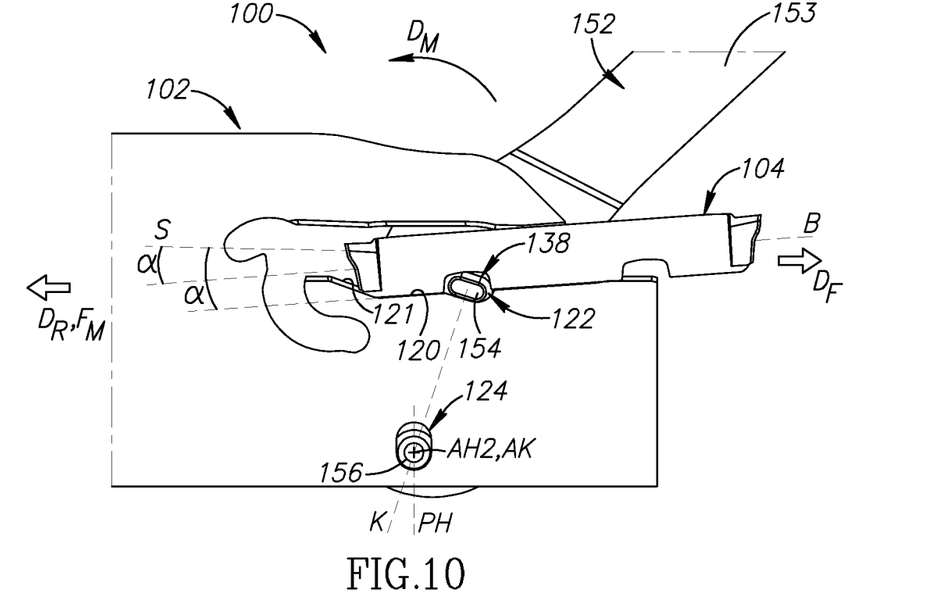
FIG. 10 is a side view of the cutting tool of FIG. 1, with a cutting tool key, in a partially assembled position.
Figure 11:
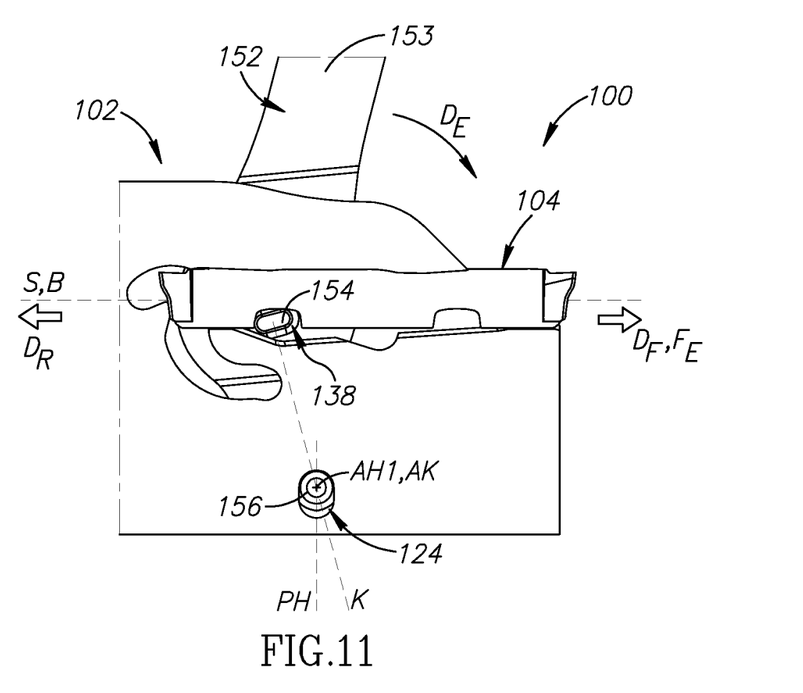
FIG. 11 is a side view of the cutting tool of FIG. 1, with a cutting tool key, in an assembled position.

Reference is now made to FIGS. 10 and 11. The cutting tool 100 may further include a cutting tool key 152, for extracting and mounting the cutting insert 104 from and into the holder blade 102. The cutting tool key 152 includes a handle member 153, a first key member 154 and a second key member 156, with a key axis K passing through both key members 154, 156. The first key member 154 is formed to fit into one of the insert key recesses 138 (specifically, the insert key recess that is further back in the insert receiving slot 110), while the second key member 156 is formed to fit into the holder recess 124 and to move along the holder plane PH. The second key member 156 may have a circular contour with a transverse key member axis AK. In the example embodiment depicted in the drawings, the holder recess 124 has an oval shape with the holder plane PH passing through the long dimension thereof, thus allowing the circular second key member 156 to fit therein, and further to move along the holder plane PH.

According to a further aspect of the present invention, there is provided a method of mounting and extracting the cutting insert 104 into and from a cutting tool 100 by means of the cutting tool key 152. In the assembled position shown in FIG. 11, the cutting tool key 152 is positioned relative to the cutting tool 100, such that the first key member 154 engages one of the insert key recesses 138, and the second key member 156 simultaneously engages the holder recess 124. The key member axis AK of the second key member 156 then coincides with the first holder recess axis AH1.

The cutting tool key 152 is rotated from the assembled position in an extracting direction $D_E$. By this rotation, the first key member 154 contacts and presses against the insert key recess 138, thereby applying an extraction force $F_E$ on the cutting insert 104, moving the cutting insert 104 in the forward direction $D_F$. In this manner, the cutting insert 104 is released from the resilient clamping of the upper and lower jaws 112, 114 of the holder blade 102. The cutting insert 104 is moved forward until reaching a partially assembled position shown in FIG. 10, in which the insert lower surface 128 rests on the insert leading surface 120. From this position, the cutting insert 104 may be removed from the insert receiving slot 110 by pulling in the forward direction $D_F$ (e.g., by a manual force).

When assembling the cutting tool 100, the cutting tool 100 is first moved to the partially assembled position, such that the insert lower surface 128 slides along the insert leading surface 120, until the peripheral surface 130 contacts the transition surface 121. In this position, the insert mid-axis B assumes the orientation of, and is parallel to the insert leading surface 120, and one of the insert key recesses 138 faces the lower jaw recess 122. Thus, the insert mid-axis B forms the tilt angle α with the slot axis S, in a side view of the cutting tool 100, similarly to the orientation of the insert leading surface 120.

With further reference to FIG. 4, the upper jaw 112 of the holder blade 102 ends at a forwardmost upper jaw tip 140, spaced apart from the lower jaw top surface 116 by a slot opening distance M (i.e., the shortest distance along a line perpendicular to the lower jaw top surface 116). The slot opening distance M equals to the insert height HI, thereby allowing the cutting insert 104 to be inserted into and removed from the insert receiving slot 110. Since the cutting insert 104 has a longitudinally elongated structure, the insert leading surface 120 is preferably tilted in the rearward and downward directions $D_R$, D, relative to the slot axis S. This is preferable in order to allow insertion of the cutting insert 104 along the insert leading surface 120 without pressure being applied by the forward portions of upper jaw clamping surface 115 on the cutting insert 104 during insertion into the insert receiving slot 110.

With further reference to FIG. 10, in the partially assembled position, the cutting tool key 152 is positioned relative to the cutting tool 100, such that the first key member 154 engages the insert key recess 138 which faces the lower jaw recess 122, and the second key member 156 simultaneously engages the holder recess 124. The key member axis AK of the second key member 156 coincides with the second holder recess axis AH2. Then, the cutting tool key 152 is rotated in a mounting direction $D_M$, opposite to the extracting direction $D_E$. By this rotation, the first key member 154 contacts and presses against the insert key recess 138, thereby applying a mounting force $F_M$ on the cutting insert 104, moving the cutting insert 104 in the rearward direction $D_R$. The cutting insert 104 is moved rearwards, sliding along the transition surface 121, until the insert stopper abutment surface 148 abuts the holder rear stopper 150, i.e., until the cutting tool 100 reaches the assembled position. It should be understood, that during mounting and extracting of the cutting insert 104 into and from the holder blade 102 with the aid of the cutting tool key 152, the cutting tool key 152 and the key axis K, pivot about the key member axis AK, in addition to being moved vertically along the holder plane PH, between the holder recess first and second axes AH1, AH2.

The mounting and extracting forces $F_M$, $F_E$ are required in order to force the cutting insert 104 into and out of the insert receiving slot 110, and overcome the resilience force applied by the upper jaw 112 on the cutting insert 104. When the mounting or extracting force $F_M$, $F_E$ is applied on the cutting insert 104, the upper jaw 112 is moved in the upward direction U, to a sufficient extent to allow passage of the cutting insert 104 through the insert receiving slot 110. Such movement of the upper jaw 112 is enabled due to a first flexibility passage 158 formed in the holder blade 102, rearwards of the insert receiving slot 110. A second flexibility passage 159 may be formed in a rear portion of the lower jaw 114, forming a resilient lower jaw tongue 161. The lower jaw tongue 161 may move resiliently in the downward direction D, when pressure is applied thereon, for example when the cutting insert 104 is advanced into the insert receiving slot 110. When the pressure is relieved, the lower jaw tongue 161 returns to its upward natural position (e.g., when the cutting insert 104 is removed from the insert receiving slot 110). Thus, when the cutting insert 104 is fully inserted into the insert receiving slot 110, the lower jaw tongue 161 applies an upward force on the cutting insert 104, thereby urging the cutting insert 104 in the rear portion thereof towards the upper jaw 112.

It will be understood from the foregoing that in the assembled position, the insert key recesses 138 are spaced apart from the lower jaw recess 122 along the slot axis S and so the first key member 154 cannot simultaneously occupy portions of both an insert key recess 138 and the lower jaw recess 122, while the second key member 156 is centered about the first holder recess axis AH1 and the insert longitudinal mid-axis B is parallel to the slot axis S.

It will further be understood from the foregoing that in the partially assembled position, one of the insert key recesses 138 is opposite the lower jaw recess 122 so that the first key member 154 can simultaneously occupy portions of both said one insert key recess 138 and the lower jaw recess 122 while the second key member 156 is centered about the second holder recess axis AH2, the second holder recess axis AH2 being farther from the insert slot 110 than the first holder recess axis AH1 and the insert longitudinal mid-axis B forms a tilt angle α with the slot axis S.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting insert (104) having an insert longitudinal mid-axis (B) and an insert transverse middle plane (J), the cutting insert (104) comprising:
    an insert upper surface (126), and an insert lower surface (128), the insert lower surface (128) defining a first plane (P1) perpendicular to the insert transverse middle plane (J) and the insert upper surface (128) defining a second plane (P2) parallel to the first plane (P1), the second plane (P2) being vertically spaced apart from the first plane (P1) by an insert height (H1);
    a peripheral surface (130) extending between the insert upper and lower surfaces (126, 128), and having two opposing longitudinal surfaces (134);
    two cutting edges (132); and
    two through-going transverse insert key recesses (138), each extending along a transverse insert recess axis (AI) and opening out to the longitudinal surfaces (134) and to the insert lower surface (128), the insert key recesses (138) located symmetrically about the insert transverse middle plane (J), each insert key recess (138) having an insert recess top surface (142) and two insert recess side surfaces (144),
    wherein each insert key recess (138) has a uniform recess profile (146) in any cross section taken between the two opposing longitudinal surfaces (134), along the transverse insert recess axis (AI), and
    wherein in each insert key recess (138), the insert recess side surfaces (144) are symmetrical relative to an imaginary plane (J1) which is parallel to the insert transverse middle plane (J) and contains the transverse insert recess axis (AI).

2. The cutting insert (104) of claim 1, wherein the insert recess top surfaces (142) are located on an insert recess top plane (P5) parallel to the first plane (P1), and wherein:
    the insert recess top plane (P5) is spaced apart from the first plane (P1) by an insert recess height (N) and,
    the insert recess top plane (P5) is spaced apart from the second plane (P2) by a first distance (D1), and the insert recess height (N) is smaller than the first distance (D1), and
    the insert recess top plane (P5) is vertically spaced apart from the insert mid-axis (B) by a second distance (D2), and the insert recess height (N) is greater than the second distance (D2).

3. The cutting insert (104) of claim 1, wherein the insert key recesses (138) have an insert recess height (N) which is between ¼ and ½ the insert height (H1).

4. The cutting insert (104) of claim 1, wherein
    the imaginary plane (J1) is spaced apart from the insert transverse middle plane (J) by a first longitudinal distance (L1);
    a transverse cutting edge plane (Q) passes through the cutting edge (132), adjacent to the transverse insert recess axis (AI), and the imaginary plane (J1) is spaced apart from the cutting edge plane (Q) by a second longitudinal distance (L2), and
the first longitudinal distance (L1) is smaller than the second longitudinal distance (L2).

5. The cutting insert (104) of claim 1, wherein the cutting edges (132) are associated with the insert upper surface (126).

6. A cutting tool (100) comprising a holder blade (102) and a cutting insert (104), wherein:
the holder blade (102) comprises:
two opposing side surfaces (106) and a holder front surface (108);
an insert receiving slot (110) having a longitudinal slot axis (S) and opening out to the holder front surface (108) and to the side surfaces (106), the insert receiving slot (110) comprising:
an upper jaw (112) having at least one longitudinal upper jaw clamping surface (115); and
a lower jaw (114) having a lower jaw top surface (116) including a plurality of longitudinal lower jaw clamping portions (118), an insert leading surface (120), and a lower jaw recess (122) opening out to the insert leading surface (120) and to at least one of the side surfaces (106); and
a holder recess (124) opening out to at least one of the side surfaces (106), the holder recess (124) being located below the lower jaw top surface (116) in a side view of the holder blade (102); and
the cutting insert (104) having an insert longitudinal mid-axis (B) and comprising:
an insert upper surface (126), an insert lower surface (128) and a peripheral surface (130) extending therebetween, the peripheral surface (130) having two opposing longitudinal surfaces (134), the insert lower surface (128) having a plurality of insert lower clamping portions (136); and
two through-going transverse insert key recesses (138) each extending along a transverse insert recess axis (AI) and opening out to the longitudinal surfaces (134) and to the insert lower surface (128), each insert key recess (138) has a uniform recess profile (146) in any cross section taken between the two opposing longitudinal surfaces (134), along the transverse insert recess axis (AI);
in an assembled position, the cutting insert (104) is located in a rearmost position in the insert receiving slot (110), the insert lower clamping portions (136) are clamped against the lower jaw clamping portions (118), and the insert upper surface (126) is clamped against the at least one upper jaw clamping surface (115).

7. The cutting tool (100) of claim 6, wherein the insert leading surface (120) is tilted by a tilt angle (α) in the rearward and downward directions ($D_R$, D), relative to the slot axis (S) in a side view of the cutting tool (100).

8. The cutting tool (100) of claim 6, wherein the cutting insert (104) has an insert longitudinal mid-axis (B),
in a partially assembled position, the insert longitudinal mid-axis (B) is parallel to the insert leading surface (120), and
in the assembled position, the insert longitudinal mid-axis (B) is parallel to the slot longitudinal axis (S).

9. The cutting tool (100) of claim 6, wherein the cutting insert (104) has two cutting edges (132) associated with opposite ends of the insert upper surface (126).

10. The cutting tool (100) of claim 6, wherein the cutting insert (104) has an insert longitudinal mid-axis (B), and the insert upper surface (126) and insert lower clamping portions (136) each have a V-shape cross section when viewed along the insert longitudinal mid-axis (B).

11. The cutting tool (100) of claim 6, wherein the at least one upper jaw clamping surface (115) and the lower jaw clamping portions (118) have a V-shape cross section when viewed along the slot longitudinal axis (S).

12. The cutting tool (100) of claim 6, wherein the insert lower surface (128) defines a first plane (P1) and the insert upper surface (128) defines a second plane (P2) parallel to the first plane (P1), and the first and second planes (P1, P2) are vertically spaced apart by an insert height (HI), and
an upper jaw tip (140) of the upper jaw (112) is spaced apart from the lower jaw top surface (116) by a slot opening distance (M), and
the slot opening distance (M) equals to the insert height (HI).

13. The cutting tool (100) of claim 6, wherein:
the insert lower surface (128) defines a first plane (P1) and the insert upper surface (128) defines a second plane (P2) parallel to the first plane (P1),
each insert key recess (138) has an insert recess top surface (142) located on an insert recess top plane (P5) parallel to the first plane (P1), and wherein:
the insert recess top plane (P5) is spaced apart from the first plane (P1) by an insert recess height (N) and,
the insert recess top plane (P5) is spaced apart from the second plane (P2) by a first distance (D1), and the insert recess height (N) is smaller than the first distance (D1), and
the insert recess top plane (P5) is vertically spaced apart from the insert mid-axis (B) a second distance (D2), and the insert recess height (N) is greater than the second distance (D2).

14. The cutting tool (100) of claim 6, wherein the holder recess (124) has two holder recess axes (AH1, AH2) spaced apart along a transverse holder plane (PH) extending perpendicular to the slot axis (S).

15. The cutting tool (100) of claim 14, in combination with a cutting tool key (152) comprising a first key member (154) and a second key member (156), with a key axis (K) passing therethrough, wherein the first key member (154) is formed to fit into one of the insert key recesses (138), and the second key member (156) is formed to fit into the holder recess (124).

16. The cutting tool (100) of claim 15 in combination with the cutting tool key (152), wherein
the second key member (156) has a circular contour with a transverse center axis (AK),
in an assembled position of the cutting tool (100) with the cutting tool key (152) engaged to the cutting tool (100), the first key member (154) is located in one of the insert key recesses (138), and the transverse center axis (AK) of the second key member (156) coincides with the first holder recess axis (AH1),
in a partially assembled position of the cutting tool (100) with the cutting tool key (152) engaged to the cutting tool (100), the first key member (154) is simultaneously located in one of the insert key recesses (138) and also in the lower jaw recess (122), and the transverse center axis (AK) of the second key member (156) coincides with the second holder recess axis (AH2).

17. A method of mounting and extracting a cutting insert (104) into and from a cutting tool (100) by means of a cutting tool key (152); wherein
the cutting tool (100) is in accordance with claim 6;
the cutting tool key (152) has a first and second key members (154, 156), located along a key axis (K), the first key member (154) is formed to fit into the one of the insert key recesses (138), and the second key member (156) is formed to fit into the holder recess (124);

the method comprising the steps of:

positioning the cutting tool key (152) relative to the cutting tool (100) such that the first and second key members (154, 156) simultaneously engage the insert key recess (138) and the holder recess (124), respectively;

to extract the cutting insert from the assembled position, rotating the cutting tool key (152) in an extracting direction ($D_E$) to apply an extraction force ($F_E$) to move the cutting insert (104) in the forward direction ($D_F$), and to mount the cutting insert from the partially assembled position, rotating the cutting tool key (152) in a mounting direction ($D_M$), opposite to the extracting direction ($D_E$), to apply a mounting force ($F_M$) to move the cutting insert (104) in the rearward direction ($D_R$).

18. A cutting tool (100) comprising a holder blade (102) and a cutting insert (104) in accordance with claim 1, wherein:

the holder blade (102) comprises:
an upper jaw (112) having at least one longitudinal upper jaw clamping surface (115); and
a lower jaw (114) having a lower jaw top surface (116) provided with a lower jaw recess (122); and
an insert receiving slot (110) defined between the upper jaw (112) and lower jaw (114), the insert receiving slot (110) having a longitudinal slot axis (S); and
a holder recess (124) located below the lower jaw top surface (116) in a side view of the holder blade (102); and the cutting tool is adjustable between:
an assembled position in which the insert key recesses (138) are both spaced apart from the lower jaw recess (122) and the insert longitudinal mid-axis (B) is parallel to the slot axis (S); and
a partially assembled position in which one of the insert key recesses (138) is opposite the lower jaw recess (122), and the insert longitudinal mid-axis (B) forms a tilt angle (a) with the slot axis (S).

19. A cutting insert (104) having an insert longitudinal mid-axis (B) and an insert transverse middle plane (J), the cutting insert (104) comprising:

an insert upper surface (126), and an insert lower surface (128), the insert lower surface (128) defining a first plane (P1) perpendicular to the insert transverse middle plane (J) and the insert upper surface (128) defining a second plane (P2) parallel to the first plane (P1), the second plane (P2) being vertically spaced apart from the first plane (P1) by an insert height (H1);

a peripheral surface (130) extending between the insert upper and lower surfaces (126, 128), and having two opposing longitudinal surfaces (134);

two cutting edges (132); and two through-going transverse insert key recesses (138), each extending along a transverse insert recess axis (AI) and opening out to the longitudinal surfaces (134) and to the insert lower surface (128), the insert key recesses (138) located symmetrically about the insert transverse middle plane (J), each insert key recess (138) having an insert recess top surface (142) and two insert recess side surfaces (144), wherein:

each insert key recess (138) has a similar recess profile (146) in cross sections taken along the transverse insert recess axis (AI);

in each insert key recess (138), the insert recess side surfaces (144) are symmetrical relative to an imaginary plane (J1) which is parallel to the insert transverse middle plane (J) and contains the transverse insert recess axis (AI);

the insert recess top surfaces (142) are located on an insert recess top plane (P5) parallel to the first plane (P1):

the insert recess top plane (P5) is spaced apart from the first plane (P1) by an insert recess height (N);

the insert recess top plane (P5) is spaced apart from the second plane (P2) by a first distance (D1), and the insert recess height (N) is smaller than the first distance (D1); and the insert recess top plane (P5) is vertically spaced apart from the insert mid-axis (B) by a second distance (D2), and the insert recess height (N) is greater than the second distance (D2).

20. A cutting tool (100) comprising a holder blade (102) and a cutting insert (104), wherein:

the holder blade (102) comprises:
two opposing side surfaces (106) and a holder front surface (108);
an insert receiving slot (110) having a longitudinal slot axis (S) and opening out to the holder front surface (108) and to the side surfaces (106), the insert receiving slot (110) comprising:
an upper jaw (112) having at least one longitudinal upper jaw clamping surface (115); and
a lower jaw (114) having a lower jaw top surface (116) including a plurality of longitudinal lower jaw clamping portions (118), an insert leading surface (120), and a lower jaw recess (122) opening out to the insert leading surface (120) and to at least one of the side surfaces (106); and
a holder recess (124) opening out to at least one of the side surfaces (106), the holder recess (124) being located below the lower jaw top surface (116) in a side view of the holder blade (102); and the cutting insert (104) having an insert longitudinal mid-axis (B) and comprising:
an insert upper surface (126), an insert lower surface (128) and a peripheral surface (130) extending therebetween, the peripheral surface (130) having two opposing longitudinal surfaces (134), the insert lower surface (128) having a plurality of insert lower clamping portions (136); and
two through-going transverse insert key recesses (138) each extending along a transverse insert recess axis (AI) and opening out to the longitudinal surfaces (134) and to the insert lower surface (128), each insert key recess (138) has a similar recess profile (146) in cross sections taken along the transverse insert recess axis (AI);

in a partially assembled position, the insert longitudinal mid-axis (B) is parallel to the insert leading surface (120), in an assembled position, the insert longitudinal mid-axis (B) is parallel to the slot longitudinal axis (S); and in said assembled position, the cutting insert (104) is located in a rearmost position in the insert receiving slot (110), the insert lower clamping portions (136) are clamped against the lower jaw clamping portions (118), and the insert upper surface (126) is clamped against the at least one upper jaw clamping surface (115), the insert longitudinal mid-axis (B) is parallel to the slot longitudinal axis (S).

* * * * *